(12) United States Patent
Shapira et al.

(10) Patent No.: US 8,548,461 B2
(45) Date of Patent: Oct. 1, 2013

(54) DEVICE ROAMING IN HYBRID WI-FI/WIRELINE AND MULTI-AP NETWORKS

(75) Inventors: Nir Shapira, Ra'anana (IL); Oren Hencinski, Holon (IL)

(73) Assignee: Celeno Communications (Israel) Ltd, Ra'anana (IL)

( * ) Notice: Subject to any disclaimer, the term of this patent is extended or adjusted under 35 U.S.C. 154(b) by 0 days.

(21) Appl. No.: 13/465,047

(22) Filed: May 7, 2012

(65) Prior Publication Data

US 2012/0315899 A1 Dec. 13, 2012

Related U.S. Application Data

(60) Provisional application No. 61/494,990, filed on Jun. 9, 2011.

(51) Int. Cl.
*H04W 4/00* (2009.01)

(52) U.S. Cl.
USPC ........................................... 455/432.1

(58) Field of Classification Search
USPC ............................ 455/432.1, 436–448
See application file for complete search history.

(56) References Cited

U.S. PATENT DOCUMENTS

| 2004/0077353 | A1* | 4/2004 | Mahany | 455/448 |
| 2007/0021126 | A1* | 1/2007 | Nanda et al. | 455/456.1 |
| 2008/0049675 | A1* | 2/2008 | Burgan et al. | 370/331 |

OTHER PUBLICATIONS

IEEE standard 802.11r-2008, "IEEE Standard for Information Technology—Telecommunications and Information Exchange between 20 Systems—Local and Metropolitan Area Networks—Specific Requirements; Part 11: Wireless LAN Medium Access Control (MAC) and Physical Layer (PHY) Specifications; Amendment 2: Fast Basic Service Set (BSS)", Jul. 15, 2008.

IEEE Std 802.11h™-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe", Oct. 14, 2003.

\* cited by examiner

*Primary Examiner* — Temica M Beamer
*Assistant Examiner* — Joel Ajayi
(74) *Attorney, Agent, or Firm* — D. Kligler I.P. Services Ltd.

(57) ABSTRACT

A method for communication includes communicating between a first transceiver and a wireless communication terminal on a first channel, while identifying the first transceiver to the terminal with a transceiver identity. A roaming condition, which determines whether the terminal is to roam to a second transceiver operating on a second channel, is evaluated. Upon meeting the roaming condition, the terminal is instructed to switch to the second channel, and the terminal is subsequently communicated with using the second transceiver on the second channel while identifying the second transceiver to the terminal with the same transceiver identity as the first transceiver.

32 Claims, 2 Drawing Sheets

DEVICE ROAMING IN HYBRID WI-FI/WIRELINE AND MULTI-AP NETWORKS

CROSS-REFERENCE TO RELATED APPLICATIONS

This application claims the benefit of U.S. Provisional Patent Application 61/494,990, filed Jun. 9, 2011, whose disclosure is incorporated herein by reference.

FIELD OF THE INVENTION

The present invention relates generally to wireless communication, and particularly to methods and systems for device roaming in wireless communication networks.

BACKGROUND OF THE INVENTION

Many wireless communication networks support roaming processes for allowing mobile communication devices to transition from one base station to another. For example, roaming in IEEE 802.11 Wireless Local Area Networks (WLAN) is specified in IEEE Standard 802.11r-2008, entitled "IEEE Standard for Information Technology—Telecommunications and Information Exchange between Systems—Local and Metropolitan Area Networks-Specific Requirements Part 11: Wireless LAN Medium Access Control (MAC) and Physical Layer (PHY) Specifications Amendment 2: Fast Basic Service Set (BSS)," 2008, which is incorporated herein by reference.

SUMMARY OF THE INVENTION

An embodiment of the present invention that is described herein provides a method for communication. The method includes communicating between a first transceiver and a wireless communication terminal on a first channel, while identifying the first transceiver to the terminal with a transceiver identity. A roaming condition, which determines whether the terminal is to roam to a second transceiver operating on a second channel, is evaluated. Upon meeting the roaming condition, the terminal is instructed to switch to the second channel, and the terminal is subsequently communicated with using the second transceiver on the second channel while identifying the second transceiver to the terminal with the same transceiver identity as the first transceiver.

In some embodiments, the first and second transceivers include Access Points (APs) of a Wireless Local Area Network (WLAN), and the transceiver identity includes at least one of a Service Set Identifier (SSID) and a Basic Service Set Identifier (BSSID). In an embodiment, instructing the terminal includes sending to the terminal a channel change command that instructs the terminal to change the channel but to remain associated with the same transceiver.

In a disclosed embodiment, communicating with the terminal using the second transceiver includes establishing communication between the second transceiver and the terminal using same communication parameters used for communication between the first transceiver and the terminal. In another embodiment, communicating with the terminal using the second transceiver includes establishing communication between the second transceiver and the terminal without negotiating communication parameters between the second transceiver and the terminal. In yet another embodiment, communicating with the terminal using the second transceiver includes transferring to the second transceiver one or more communication parameters used for communication between the first transceiver and the terminal, and causing the second transceiver to communicate with the terminal using the communication parameters.

In some embodiments, after switching to the second channel, the method includes determining that the second transceiver is unsuitable for communicating with the terminal, and taking an alternative action. Taking the alternative action may include instructing the terminal to switch back to the first transceiver, instructing the terminal to switch to a third transceiver, initiating communication with the terminal over an alternate communication protocol, or denying communication with the terminal. In an embodiment, evaluating the roaming condition includes estimating a quality metric for the first channel, and deciding whether to roam to the second channel based on the estimated quality metric.

In some embodiments, evaluating the roaming condition includes balancing a traffic load between the first and second transceivers. In an example embodiment, evaluating the roaming condition includes assessing a traffic need of the terminal, and deciding whether to roam to the second channel based on the assessed traffic need. Additionally or alternatively, evaluating the roaming condition may include assessing a traffic capability of the first or second transceiver, and deciding whether to roam to the second channel based on the assessed traffic capability.

In an embodiment, before evaluating the roaming condition, the method includes carrying out a channel selection process that assigns multiple channels to multiple respective transceivers, including assigning the first and second channels to the first and second transceivers, respectively. Carrying out the channel selection process may include assigning a given channel to at least two of the multiple transceivers. The method may include coordinating access to the given channel among the two or more transceivers assigned to the given channel.

In another embodiment, carrying out the channel selection process includes disabling one or more of the multiple transceivers in order to assign each transceiver that is not disabled a different respective channel. In yet another embodiment, the method includes distributing multiple terminals, including the wireless communication terminal, among the multiple transceivers by evaluating the roaming condition and instructing the wireless communication terminal to switch.

There is additionally provided, in accordance with an embodiment of the present invention, a communication system including at least first and second transceivers and at least one processor. The first and second transceivers are configured to communicate with wireless communication terminals on respective first and second channels, while both identifying to the terminals with a transceiver identity. The processor is configured to evaluate a roaming condition that determines whether a wireless communication terminal is to roam from the first transceiver to the second transceiver, and, upon meeting the roaming condition, to instruct the terminal to switch from the first channel to the second channel, and to cause the second transceiver to subsequently communicate with the terminal while identifying to the terminal with the same transceiver identity as the first transceiver.

The present invention will be more fully understood from the following detailed description of the embodiments thereof, taken together with the drawings in which:

DETAILED DESCRIPTION OF EMBODIMENTS

Overview

Figure 1:
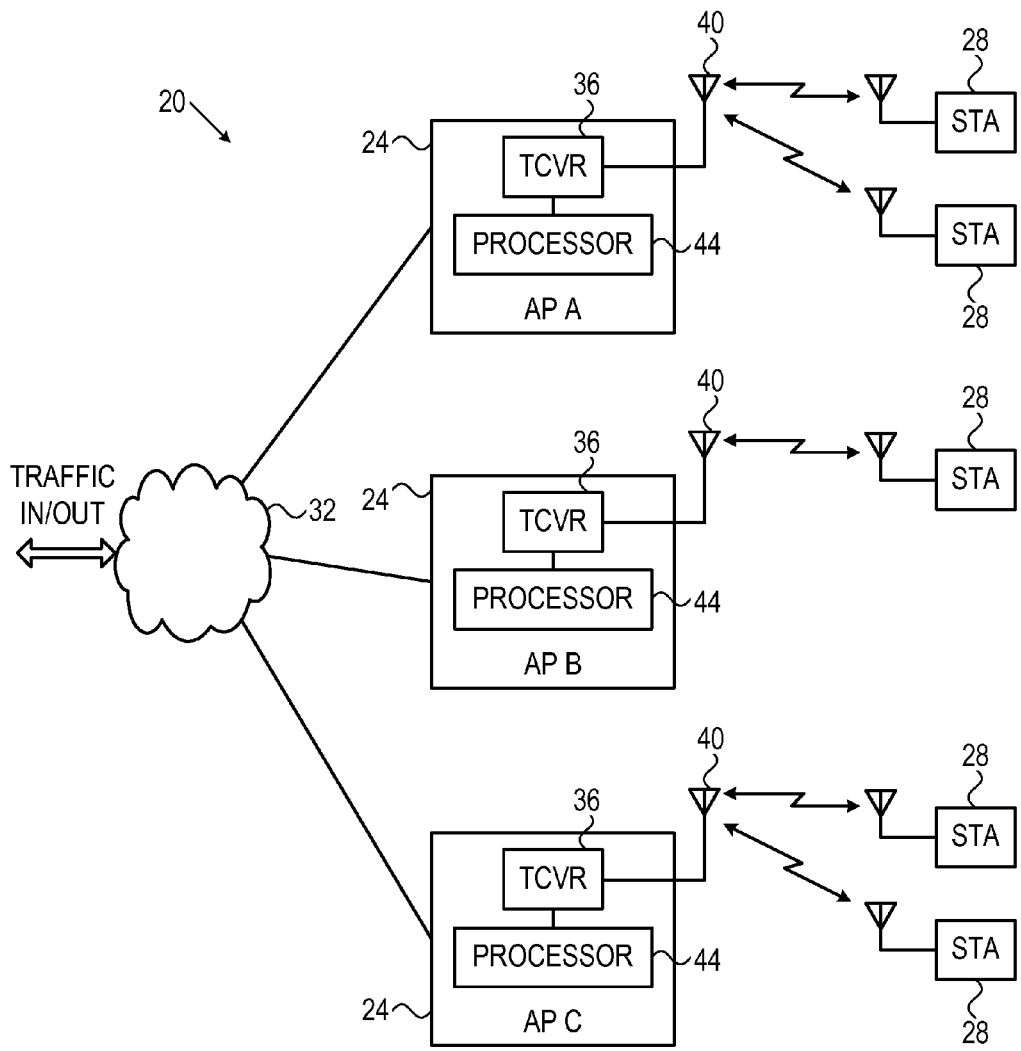
FIG. 1 is a block diagram that schematically illustrates a wireless communication system, in accordance with an embodiment of the present invention.

Embodiments of the present invention that are described herein provide improved methods and systems for roaming in wireless networks, such as Wireless Local Area Networks (WLANs). In some embodiments, a wireless communication system comprises multiple transceivers that cover a certain geographical area and provide communication services to wireless communication terminals. Amongst other functions, the system supports a highly-efficient roaming process that enables terminals to transition from one transceiver to another rapidly and with little or no loss of data.

In the embodiments described herein, the transceivers comprise WLAN Access Points (APs) and the terminals comprise WLAN Stations (STAB). The disclosed techniques, however, are applicable to various other types of wireless networks.

In some embodiments, multiple transceivers in the system (in the present example APs) identify to the communication terminals (in the present example STAB) with the same transceiver identity or identifier (e.g., a single Service Set Identifier (SSID) or a single Basic SSID (BSSID) in a WLAN implementation). Thus, from the point of view of the STAB, the different APs appear logically as a single AP.

In a typical embodiment, a STA initially communicates with an AP denoted AP A on a certain channel. A processor in the system (e.g., in one of the APs or in any other system element) evaluates a roaming condition so as to determine that the STA is to roam to a different AP denoted AP B. Upon meeting the roaming condition, AP A instructs the STA to switch to the channel of AP B, and communication is subsequently resumed with the STA via AP B.

Since both AP A and AP B identify to the STA using the same AP identity (e.g., SSID or BSSID), the STA is typically unaware that roaming took place. From the point of view of the STA, the entire roaming process appears as a channel switch.

In some embodiments, AP A and AP B communicate with one another over wireless or wireline media, and are thus able to coordinate the roaming process between them. For example, AP A may notify AP B of the imminent roaming, and provide AP B with attributes of the STA and/or the link to the STA. This coordination enables the APs to perform seamless or nearly seamless roaming, without a need for cooperation or awareness on the part of the STA.

The processor may initiate the roaming process based on various kinds of roaming conditions. The roaming condition may depend, for example, on the link quality between the APs and the STA, and/or on traffic needs or capabilities of the STAB and/or APs. As another example, the processor may assign STAB to APs based on some policy or criterion, and instruct the STAB to roam to their designated APs using the disclosed roaming process.

In summary, the roaming processes described herein enables fast roaming with little or no loss of data, and are typically transparent to the STAB. The roaming process can be used with conventional WLAN STAB without a need for hardware or software modification. The disclosed techniques can be used in various wireless network applications, such as in hybrid wireless/wireline home network configurations.

System Description

FIG. 1 is a block diagram that schematically illustrates a wireless communication system 20, in accordance with an embodiment of the present invention. System 20 comprises multiple WLAN APs 24 that communicate with WLAN STAB 28 in a certain geographical area.

In the present example, APs 24 and STAB 28 operate in accordance with the IEEE 802.11 WLAN standards. STAB may comprise any suitable WLAN-capable devices. In alternative embodiments, however, the disclosed techniques can be used in various other wireless systems, which any suitable type of transceivers and communication terminals.

In the configuration of FIG. 1, although not necessarily, APs 24 are interconnected by a network 32. Network 32 may comprise, for example, a wireline network such as an IEEE 802.3 Local Area Network (LAN), a powerline communication network, a Multimedia over Coax Alliance (MoCA) network, or any other suitable network type. Alternatively, network 32 may comprise a suitable wireless network. In one example embodiment, the APs comprise dual-band devices, communicating with the STAB over a 5 GHz WLAN and with one another over a 2.4 GHz WLAN.

In the present example, system 20 comprises a hybrid wireline/wireless network for the home, i.e., APs 24 cover different rooms or areas in a given home. Communication traffic, e.g., packets or frames, enters and exits the home via network 32, and is relayed to STAB using APs 24. Alternatively, system 20 may comprise any other suitable system type that is deployed in any other suitable indoor or outdoor environment.

System 20 may comprise any suitable number of APs 24. The present example shows three APs denoted AP A, AP B and AP C. Each AP 24 comprises a respective transceiver 36 for communicating with STAB 28 via an antenna array 40, and a respective processor 44 that manages the operation of the AP.

As will be explained in detail below, system 20 supports a highly-efficient roaming process that enables STAB 28 to roam from one AP to another. The roaming process may be carried out by one or more of processors 44 of APs 24, by a separate processor (not shown) that is external to the APs, and/or by any other suitable processor. The roaming process may be partitioned between such processors in any suitable manner. For the sake of clarity, the description that follows sometimes refers to "a processor" that carries out the roaming process. This reference means to cover any suitable implementation using one or more processors, either internally to the APs or otherwise.

The configuration of system 20 shown in FIG. 1 is an example configuration, which is chosen purely for the sake of conceptual clarity. In alternative embodiments, any other suitable system configuration can be used. Some elements of system 20 may be implemented in hardware, e.g., in one or more Application-Specific Integrated Circuits (ASICs) or Field-Programmable Gate Arrays (FPGAs). Additionally or alternatively, some elements of system 20, such as processors 44, can be implemented using software, or using a combination of hardware and software elements.

Some of the functions of system 20, such as some or all of the functions of processors 44, may be carried out using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Device Roaming Schemes

In some embodiments, system 20 supports a roaming process for transitioning STA B 28 from one AP 24 to another. Each AP 24 typically operates on a different channel, e.g., on a different frequency. All the APs, however, identify to the STAs using the same AP identifier (e.g., the same BSSID or SSID).

From the point of view of the roaming STA, the disclosed roaming process appears as a switch of channel. The roaming STA is typically unaware of the fact that roaming takes place. In other words, the roaming STA is unaware of whether the serving AP following the channel switch is the same as or different from the serving AP before the channel switch. This process can therefore be used with conventional or legacy STAs, without a need for modification or upgrade.

Figure 2:
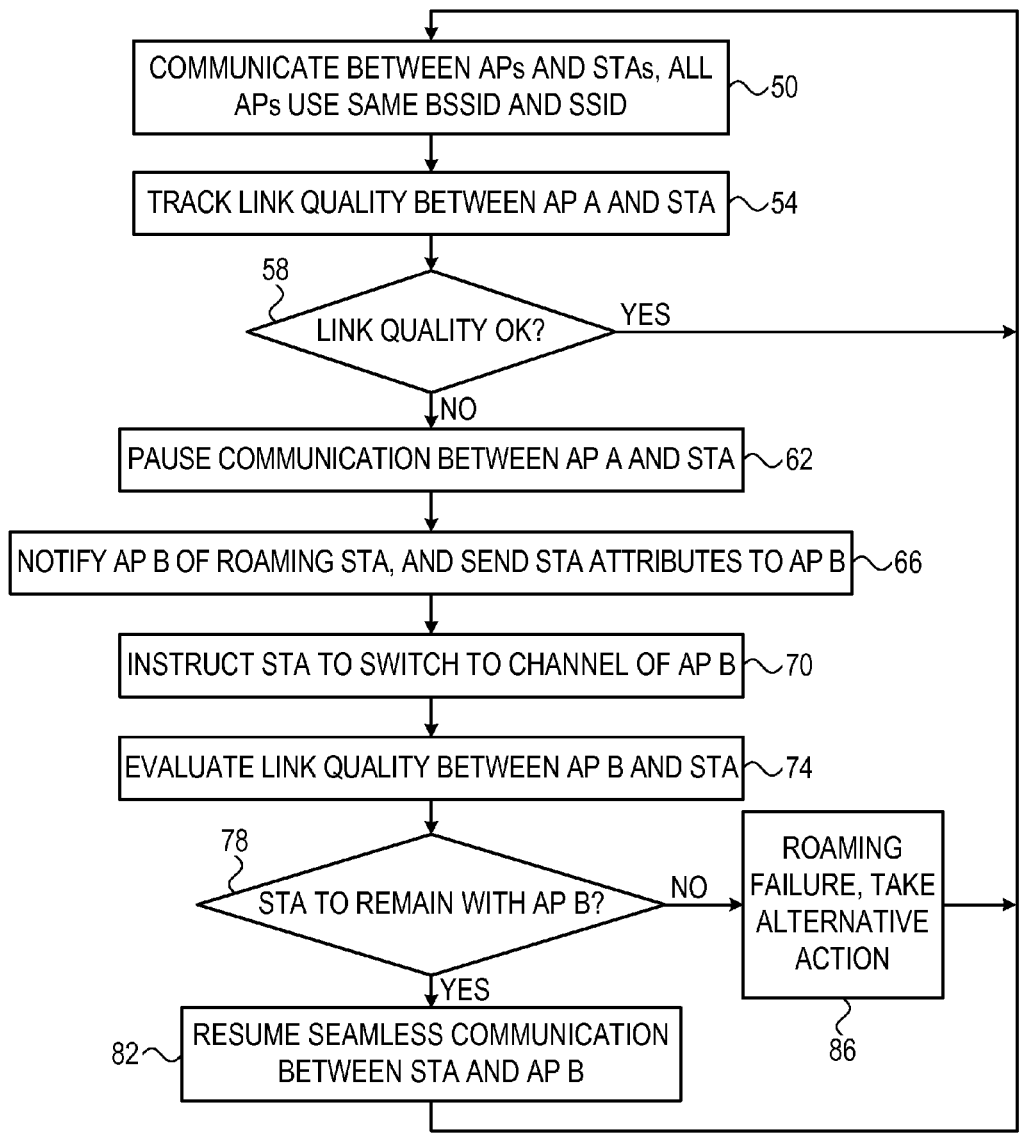
FIG. 2 is a flow chart that schematically illustrates a method for roaming in a wireless communication system, in accordance with an embodiment of the present invention.

FIG. 2 is a flow chart that schematically illustrates a method for roaming in system 20, in accordance with an embodiment of the present invention. As explained above, the description that follows refers to "a processor" that carries out the roaming process, but in practice the processor functions may be implemented in one or more processors 44 of the APs, or in any other suitable processor.

The method begins with APs 24 of system 20 communicating with STAs 28, at a communication step 50. Typically, all the APs identify to the STAs using the same AP identifier (BSSID or SSID), so as to appear to the STAs logically as a single AP. At any given point in time, each STA 28 is associated with a particular AP referred to as the serving AP of the STA.

Consider a given STA that is served by AP A in FIG. 1. The processor (typically processor 44 of AP A) tracks the link quality of the communication channel between the AP and the STA, at a quality tracking step 54. This step is typically performed by each AP for each of its associated STAs. The processor may assess the link quality directly, e.g., by performing measurements on the reverse channel from the STA to the AP, or indirectly by receiving from the STA feedback relating to the forward channel from the AP to the STA. The processor may assess the link quality using any suitable metric, which may relate to signal quality, to Quality of Service (QoS) or to any other property that is indicative of the link quality between the AP and the STA. Such metrics may comprise, for example, Signal to Noise Ratio (SNR), Packet Error Rate (PER), delay, jitter, and/or any other suitable metric or combination of metrics.

The processor checks whether the assessed link quality is sufficiently high, at a quality checking step 58. For example, the processor may compare the assessed link quality to a predefined threshold. If the link quality is sufficient for allowing the STA to remain associated with the same AP, the method loops back to step 50 above.

Otherwise, the processor initiates a roaming process that will transition the STA from AP A to another AP, in the present example to AP B. Initially, the processor pauses the communication between AP A and the STA, at a pausing step 62, and notes the last frame that was sent to the STA. The processor notifies AP B that the STA is about to roam to it, at a notification step 66.

In some embodiments, the processor also sends to AP B one or more attributes of the STA or of the communication with the STA, so that communication between the STA and AP B can be resumed rapidly and without negotiation. AP A may send the notification and/or attributes to AP B over any suitable communication means between them, e.g., an IEEE 802.3 link, MoCA link, powerline link or another IEEE 802.11 WLAN link in a different band, when the APs comprise dual-band devices.

The transferred attributes may comprise, for example, link budget metrics for the STA, traffic description for the STA (e.g., priority or average traffic bandwidth), STA capabilities (e.g., MAC and PHY capabilities), status and content of STA queues, block ACK session details for the STA, security keys used in communication with the STA, indication of the last successfully-delivered frame, and/or any other suitable attribute.

The processor then causes AP A to instruct the STA to switch to the channel of AP B, at a channel switching step 70. In an example embodiment, the instruction comprises a channel change command as specified in the IEEE 802.11h standard. This command is typically no different from a command to change a channel vis-à-vis the same AP, and it does not indicate to the STA that roaming is to take place. After the STA has switched to the channel of AP B, the processor causes AP B to evaluate the link quality between AP B and the STA, at a quality evaluation step 74.

AP B may evaluate any suitable link quality metric for this purpose, such as any of the metrics used at step above. In alternative embodiments, AP B may measure the Received Signal Strength Indication (RSSI) on the reverse channel, or evaluate the forward channel by performing a sounding operation and receiving feedback from the STA.

Based on the evaluated channel, the processor decides whether the STA is to remain associated with AP B or not, at a roaming checking step 78. The decision in step 78 may be taken by AP B based on the information it received from AP A, e.g., at step 66. Alternatively, the decision can be taken by AP A based on information regarding the new channel provided by AP B. Further alternatively, the decision can be taken by any other element in the system, and conveyed back to AP B.

If the decision is to have the STA remain with AP B, the processor causes AP B to resume communication with the STA, at a resumption step 82. AP B typically resumes the communication using the attributes provided by AP A at step 66 above. As such, the link can be established seamlessly without re-negotiation with the STA, with small latency and with little or no loss of data. In some embodiments AP B notifies AP A of the decision, and of the newly measured link quality metrics.

In some embodiments, AP B requests some of the STA attributes, for example STA data queue content, after the decision of step 78 is taken. This feature can be useful, for example, when the data size in question is large and it is preferable not to ask for it in advance, in case the STA will not remain with AP B. The method then loops back to step 50 above.

If, on the other hand, the decision in step 78 is that the STA is not to remain with AP B, the processor concludes that the roaming attempt has failed and takes alternative action, at a failure step 86. One possible alternative action is to return the STA to communicate with AP A. In this embodiment, AP B typically reports the decision to AP A. AP B may also report the reason for the decision, e.g., poor link quality on the channel of AP B. The STA is then instructed to switch back to the channel of AP A, e.g., using a DFS channel change command. AP A can then resume communication with the STA.

Another possible alternative action is to hand off the STA to yet another AP (e.g., AP C). Yet another possibility is to deny service from the STA, e.g., when dynamic admission control is supported. When system 20 comprises a hybrid network (e.g., in accordance with the emerging P.1950.1 standard), and/or when the STA is reachable using an alternate communication protocol (e.g., powerline communication), the alternative action may be to establish communication with the STA over the alternate protocol and not via APs 24.

The method flow of FIG. 2 is an example flow, which is chosen purely for the sake of conceptual clarity. In alternative embodiments, the processor may apply the disclosed roaming process using any other suitable sequence of steps.

For example, the decision to transfer the STA from AP A to AP B based on link quality metrics is only a specific example of a roaming condition that can be evaluated by the processor. In alternative embodiments, the processor may decide to transfer an STA from one AP to another by evaluating any other suitable roaming condition. The roaming condition need not necessarily depend on link quality and may depend on other factors, such as bandwidth needs and capabilities of the APs and/or STAB.

In one example embodiment, the processor may evaluate the roaming condition periodically for the various STAB, irrespective of their link quality. This sort of solution may be used for dynamically reassigning STAs to APs. Moreover, such a solution may prevent the link quality from deteriorating in the first place.

Initial Channel Selection

In some embodiments, the roaming condition is used for defining and applying a dynamic assignment of STAs to APs. In other words, system 20 may use the disclosed roaming process to perform initial assignment and subsequent reassignment of STAs to APs. The coordination between APs in this process may be performed over any suitable communication medium, e.g., over the same 5 GHz band used for communicating with the STA, over another wireless link such as a 2.4 GHz link, or using a wireline medium.

In a typical initial channel selection process, after system 20 is switched on each AP 24 in the system makes an initial selection of a channel to operate on. The channel selection process is typically, although not necessarily, performed by cooperation between the different APs.

Typically, the APs select their respective channels without prior knowledge of the identities, numbers or locations of STAs 28. In an example embodiment, each AP scans the frequency spectrum, evaluates the interference conditions, possibly identify the currently-existing STAs, and then decide (jointly or independently) on the channel to be selected by each AP.

In some embodiments, each AP is assigned a different channel. In other embodiments, there is insufficient spectrum for such an assignment, and thus two or more of the APs need to be assigned the same channel.

The latter embodiments may involve scheduling or other coordination among the APs that use the same channel, particularly since all the APs identify using the same AP identifier (e.g., BSSID). In such a scenario, identical beacon frames sent by different APs may confuse the STAB.

In an example embodiment, the processor coordinates the transmissions of the APs on a given channel to occur in non-overlapping time slots, in order to avoid collisions. In another embodiment, the processor disables one or more of the APs in the system, thereby eliminating the need to operate multiple APs on the same channel. In this embodiment, the processor may dynamically activate and deactivate APs according to channel and traffic conditions to the different STAB.

In some embodiments, when multiple APs share the same channel and use the same AP identifier, the MAC modules of the APs support a mechanism that identifies which STAB on the channel is served by which AP. For example, each AP is to send acknowledgement (ACK) frames only to the STAB it serves.

After making the initial channel selection, the STAB are free to choose which AP to associate with according to their own channel selection scheme. After an STA has associated on a certain channel, the AP on that channel (or the processor in general) may instruct the STA to switch to the channels of other APs in order to evaluate the link metrics on those channels.

Based on this information, the processor may assign the STA to an appropriate channel (and thus AP). Typically, it can be assumed that each STA will choose the channel (and thus AP) that will provide it with the best link metric. The processor may later change this channel selection for reasons of load balancing, since the STA is typically unaware of the overall system traffic needs upon initial scan and association.

Figure 3:
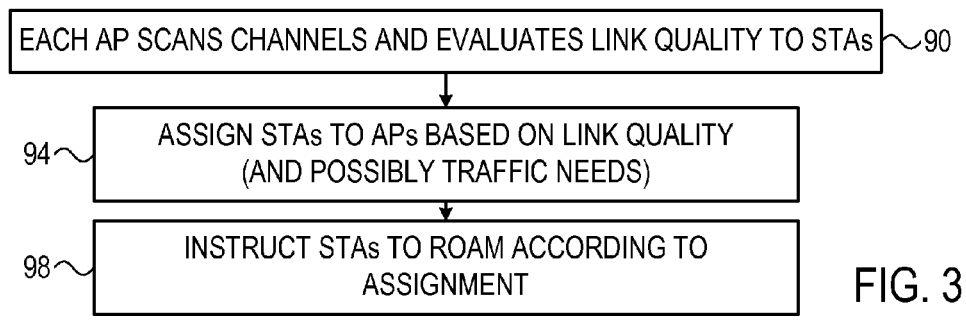
FIG. 3 is a flow chart that schematically illustrates a method for initial channel assignment in a wireless communication system, in accordance with an embodiment of the present invention.

FIG. 3 is a flow chart that schematically illustrates a method for initial channel assignment in system 20, in accordance with an embodiment of the present invention. The method begins with each AP 24 scanning the at least some of the frequency channels of system 20 and evaluating the link quality to at least some of the STAB, at a channel scanning step 90.

The processor defines an initial assignment of STAB to APs based on the evaluated link quality, at an assignment step 94. The assignment may also depend on traffic needs of the different STAB and/or the traffic capabilities (e.g., available capacity) of one or more of the APs. The processor instructs each STA to roam to its designated AP, in accordance with the assignment, at a roaming instruction step 98. This step is typically implemented using the roaming process defined above. The method of FIG. 3 can be used for initial channel selection, as well as for dynamic reassignment of STAB to APs to match varying conditions, varying locations and varying traffic needs, for example.

In one embodiment, the STAB initially associate with APs in accordance with a certain default channel selection, typically regardless of the locations of the STAB and APs. Then, the method of FIG. 3 is used to reassign the STAB to the APs so as to optimize link quality and/or traffic needs. The assignment can take traffic needs into account if this information is known to the PAs, for example if TSPEC is available per stream.

When implementing the channel scanning of step 90, each STA may be instructed to switch to the channels of the various APs, and the APs are then able to evaluate the link quality to the various STAB. When all link quality metrics are collected, the STAB are re-distributed among the APs using the disclosed roaming process.

When implementing the roaming process described herein, a deadlock may occur if an STA is instructed to switch to the channel of a new AP, but the link quality on the new channel is so poor that communication cannot be established with the new AP. In one embodiment, the STA overcomes this problem by performing a re-scan when it fails to establish communication with the new AP.

In an alternative embodiment, the new AP detects this situation and, after a certain time-out period from the time it was notified that the STA is supposed to join, reports back to the old AP that the roaming operation failed. The old AP can then temporarily switch to the channel of the new AP, resume communication with the STA and instruct it to switch back to the channel of the old AP. The old AP then returns to its own channel and resumes operation. Further alternatively, when the STA is aware of the roaming operation, it can choose to return to the channel of the old AP after a time-out period.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
configuring multiple different transceivers, including at least first and second transceivers operating on respective first and second channels, with a single transceiver identifier, such that the multiple transceivers appear to wireless communication terminals as a single transceiver;
communicating between the first transceiver and a wireless communication terminal on the first channel, while identifying the first transceiver to the terminal with the single transceiver identifier; and
when the terminal is to roam, sending to the terminal a channel switch command to switch to the second channel, which appears to the terminal as a channel switch confined to the single transceiver but which causes the terminal to start communicating with the second transceiver instead of with the first transceiver, while identifying the second transceiver to the terminal with the single transceiver identifier.

2. The method according to claim 1, wherein the first and second transceivers comprise Access Points (APs) of a Wireless Local Area Network (WLAN), and wherein the single transceiver identifier comprises at least one of a Service Set Identifier (SSID) and a Basic Service Set Identifier (BSSID).

3. The method according to claim 1, and comprising, subsequently to sending the channel switch command, establishing communication between the second transceiver and the terminal using same communication parameters used for communication between the first transceiver and the terminal.

4. The method according to claim 1, and comprising, subsequently to sending the channel switch command, establishing communication between the second transceiver and the terminal without negotiating communication parameters between the second transceiver and the terminal.

5. The method according to claim 1, The method according to claim 1, and comprising, subsequently to sending the channel switch command, transferring to the second transceiver one or more communication parameters used for communication between the first transceiver and the terminal, and causing the second transceiver to communicate with the terminal using the communication parameters.

6. The method according to claim 1, and comprising, after switching to the second channel, determining that the second transceiver is unsuitable for communicating with the terminal, and taking an alternative action.

7. The method according to claim 6, wherein taking the alternative action comprises one of:
instructing the terminal to switch back to the first transceiver;
instructing the terminal to switch to a third transceiver;
initiating communication with the terminal over an alternate communication protocol; and
denying communication with the terminal.

8. The method according to claim 1, and comprising estimating a quality metric for the first channel, and deciding whether to roam to the second channel based on the estimated quality metric.

9. The method according to claim 1, wherein sending the channel switch command comprises balancing a traffic load between the first and second transceivers.

10. The method according to claim 1, and comprising assessing a traffic need of the terminal, and deciding whether to roam to the second channel based on the assessed traffic need.

11. The method according to claim 1, and comprising assessing a traffic capability of the first or second transceiver, and deciding whether to roam to the second channel based on the assessed traffic capability.

12. The method according to claim 1, and comprising, before deciding that the terminal is to roam, carrying out a channel selection process that assigns multiple channels to the multiple respective transceivers, including assigning the first and second channels to the first and second transceivers, respectively.

13. The method according to claim 12, wherein carrying out the channel selection process comprises assigning a given channel to at least two of the multiple transceivers.

14. The method according to claim 13, and comprising coordinating access to the given channel among the two or more transceivers assigned to the given channel.

15. The method according to claim 12, wherein carrying out the channel selection process comprises disabling one or more of the multiple transceivers in order to assign each transceiver that is not disabled a different respective channel.

16. The method according to claim 12, and comprising distributing multiple terminals, including the wireless communication terminal, among the multiple transceivers by evaluating a roaming condition and instructing the wireless communication terminal to switch.

17. A communication system, comprising:
multiple transceivers, including at least first and second transceivers operating on respective first and second channels, which are configured with a single transceiver identifier such that the multiple transceivers appear to wireless communication terminals as a single transceiver; and
at least one processor, which is configured to send to a wireless communication terminal a channel switch command to switch from the first channel to the second channel, which appears to the terminal as a channel switch confined to the single transceiver but which causes the terminal to start communicating with the second transceiver instead of with the first transceiver, while identifying to the terminal with the same transceiver identity as the first transceiver.

18. The system according to claim 17, wherein the first and second transceivers comprise Access Points (APs) of a Wireless Local Area Network (WLAN), and wherein the single transceiver identifier comprises at least one of a Service Set Identifier (SSID) and a Basic Service Set Identifier (BSSID).

19. The system according to claim 17, wherein the processor is configured to cause the second transceiver to establish communication with the terminal using same communication parameters used for communication between the first transceiver and the terminal.

20. The system according to claim 17, wherein the processor is configured to cause the second transceiver to establish communication with the terminal without negotiating communication parameters between the second transceiver and the terminal.

21. The system according to claim 17, wherein the processor is configured to transfer to the second transceiver one or more communication parameters used for communication between the first transceiver and the terminal, and to cause the second transceiver to communicate with the terminal using the communication parameters.

22. The system according to claim 17, wherein, after switching to the second channel, the processor is configured to determine that the second transceiver is unsuitable for communicating with the terminal, and to take an alternative action.

23. The system according to claim 22, wherein the processor is configured to take the alternative action by performing one of:
  instructing the terminal to switch back to the first transceiver;
  instructing the terminal to switch to a third transceiver;
  initiating communication with the terminal over an alternate communication protocol; and
  denying communication with the terminal.

24. The system according to claim 17, wherein the processor is configured to estimate a quality metric for the first channel, and to decide whether to roam to the second channel based on the estimated quality metric.

25. The system according to claim 17, wherein, by sending the channel switch command, the processor is configured to balance a traffic load between the first and second transceivers.

26. The system according to claim 17, wherein the processor is configured to assess a traffic need of the terminal, and to decide whether to roam to the second channel based on the assessed traffic need.

27. The system according to claim 17, wherein the processor is configured to assess a traffic capability of the first or second transceiver, and to decide whether to roam to the second channel based on the assessed traffic capability.

28. The system according to claim 17, wherein, before sending the channel switch command, the processor is configured to carry out a channel selection process that assigns multiple channels to the multiple respective transceivers, including assigning the first and second channels to the first and second transceivers, respectively.

29. The system according to claim 28, wherein the processor is configured to assign a given channel to at least two of the multiple transceivers.

30. The system according to claim 29, wherein the processor is configured to coordinate access to the given channel among the two or more transceivers assigned to the given channel.

31. The system according to claim 28, wherein the processor is configured to disable one or more of the multiple transceivers in order to assign each transceiver that is not disabled a different respective channel.

32. The system according to claim 28, wherein the processor is configured to distribute multiple terminals, including the wireless communication terminal, among the multiple transceivers by evaluating the roaming condition and instructing the wireless communication terminal to switch.

* * * * *